United States Patent
Kells et al.

(10) Patent No.: US 9,450,255 B2
(45) Date of Patent: Sep. 20, 2016

(54) EXCESS COOLANT FLUID FEED TO FUEL CELL STACKS

(71) Applicant: Intelligent Energy Limited, Loughborough (GB)

(72) Inventors: Ashley James Kells, Loughborough (GB); Simon Edward Foster, Loughborough (GB); Paul Leonard Adcock, Loughborough (GB); Jonathan Cole, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/428,953

(22) PCT Filed: Sep. 16, 2013

(86) PCT No.: PCT/GB2013/052416
§ 371 (c)(1),
(2) Date: Mar. 17, 2015

(87) PCT Pub. No.: WO2014/045019
PCT Pub. Date: Mar. 27, 2014

(65) Prior Publication Data
US 2015/0255810 A1 Sep. 10, 2015

(30) Foreign Application Priority Data
Sep. 18, 2012 (GB) .................................. 1216637.7

(51) Int. Cl.
*H01M 8/04029* (2016.01)
*H01M 8/04014* (2016.01)
(Continued)

(52) U.S. Cl.
CPC ....... *H01M 8/04029* (2013.01); *H01M 8/0202* (2013.01); *H01M 8/04067* (2013.01); *H01M 8/04768* (2013.01); *H01M 8/24* (2013.01);
(Continued)

(58) Field of Classification Search
None
See application file for complete search history.

(56) References Cited

U.S. PATENT DOCUMENTS

| 4,706,737 A | 11/1987 | Taylor et al. | |
|---|---|---|---|
| 2003/0193009 A1* | 10/2003 | Dill | H01M 8/04029 250/206 |
| 2005/0221149 A1* | 10/2005 | Matsubayashi | H01M 8/04768 429/437 |
| 2009/0233139 A1 | 9/2009 | Suzuki et al. | |

(Continued)

FOREIGN PATENT DOCUMENTS

| DE | 10 2007 037853 | 7/2008 |
|---|---|---|
| DE | 10 2009 013648 | 9/2009 |
| EP | 1473791 | 11/2004 |

OTHER PUBLICATIONS

International Search Report dated Dec. 17, 2013, issued in International patent application PCT/GB/2013/052416.
International Patent Application No. PCT/GB2013/052416; Int'l Preliminary Report on Patentability; dated Mar. 24, 2015; 6 pages.
(Continued)

*Primary Examiner* — Yoshitoshi Takeuchi
(74) *Attorney, Agent, or Firm* — Baker & Hostetler LLP

(57) ABSTRACT

A fuel cell stack assembly has a plurality of fuel cells each having a fluid coolant conduit. A coolant feed inlet manifold has a coolant inlet, and the coolant feed inlet manifold is coupled to each fluid coolant conduit for distribution of coolant to each fuel cell. The coolant feed inlet manifold also has a discharge conduit located at one end of the coolant feed inlet manifold. The discharge conduit is configured to discharge excess coolant from the coolant feed inlet manifold. By supplying excess coolant to the coolant feed inlet manifold problems arising due to very low coolant flow rates through the fluid coolant conduits in the fuel cells can be reduced or eliminated.

15 Claims, 4 Drawing Sheets

(51) Int. Cl.
*H01M 8/04007* (2016.01)
*H01M 8/04* (2016.01)
*H01M 8/24* (2016.01)
*H01M 8/02* (2016.01)
*H01M 8/10* (2016.01)

(52) U.S. Cl.
CPC ......... *H01M 8/2465* (2013.01); *H01M 8/0267* (2013.01); *H01M 8/04044* (2013.01); *H01M 8/04485* (2013.01); *H01M 2008/1095* (2013.01); *Y02E 60/50* (2013.01)

(56) References Cited

U.S. PATENT DOCUMENTS

2011/0053033 A1* 3/2011 Kobayashi ........ H01M 8/04029
429/458
2011/0143248 A1 6/2011 Katano

OTHER PUBLICATIONS

Great Britain Patent Application No. 1216637.7; Search Report; dated Nov. 29, 2012; 3 pages.

* cited by examiner

EXCESS COOLANT FLUID FEED TO FUEL CELL STACKS

CROSS-REFERENCE TO RELATED APPLICATIONS

This patent application is a Continuation of International patent application PCT/GB2013/052416 filed Sep. 16, 2013, which claims priority to Great Britain patent application GB1216637.7 filed Sep. 18, 2012, the disclosures of which are incorporated by reference in their entirety.

The present invention relates to electrochemical fuel cells disposed in a stack formation, and in particular to cooling systems for such fuel cell stacks.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack is formed comprising a number of MEAs electrically arranged in series. Each MEA is provided with separate anode and cathode fluid flow paths. The anode and cathode fluid flow paths respectively deliver fuel and oxidant to the membrane. The fuel cell stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Cooling may be achieved at least in part by the delivery of water to individual cells in the stack in either the anode fluid flow paths (which serves to hydrate the anode) and/or in the cathode fluid flow path which combines with reactant water. In each case, evaporative cooling of the fuel cells can occur.

In a typical arrangement, the cooling water is injected into the anode or cathode fluid flow channels from one or more common manifolds extending down the side of the fuel cell stack. A potential problem arises from the flow rates of water within such manifolds. Water may be fed into an inlet at one end of an inlet manifold, from which it is fed into individual cells in the stack. This results in a reduction in water flow rate along the manifold away from the inlet. If, for example, a 100 cell stack requires a flow of 100 ml/min delivered at one end of the stack, the flow rate in the manifold at the first cell will be 100 ml/min; after the 50th cell the flow rate in the manifold may be approximately 50 ml/min, and at the final cell the flow rate in the manifold may be only 1 ml/min. Such very low flows, e.g. 1 ml/min, in the manifold can lead to reliability problems for a fuel cell stack. Problems can occur in regions of stagnant or near stagnant flow due to increased corrosion risk, particularly when using deionised water, and an increased risk of build up of bacteria.

If deionised water of a high grade (for example, 18 M$\Omega$) is used as cooling fluid, then the voltage difference between each cell due to the conductivity of the water can be considered to be sufficiently low so as not to exacerbate corrosion in the stack. However, if the fuel cell stack is installed such that the deionised water can be recovered from the coolant outlet of the fuel cell stack for reintroduction to the fuel cell stack, then the conductivity of the water is likely to increase due to a number of factors, including $CO_2$ absorbed from the atmosphere, and washout of ions and impurities or contaminants from the fuel cell membranes and from metallic components in the fuel cell stack. Hence, the voltage difference across the injected water will increase, thus providing an environment where cell corrosion is more likely to occur. At the end of the fuel cell stack furthest from the cooling water inlet, the flow rate of cooling water in the inlet manifold is likely to be at a minimum, and ionic deposits from the cooling water are more likely to form and attack/corrode metal components such as flow plates in the fuel cell stack.

It is an object of the invention to provide a solution to one or more of the above problems. It is an object of the invention to reduce or eliminate problems that can arise from very low coolant flows in a coolant distribution manifold of a fuel cell stack. It is an object of the invention to provide a solution for maintaining appropriate coolant flow levels within the fuel cell stack.

According to one aspect, the invention provides a fuel cell stack assembly comprising:
   a plurality of fuel cells each having a fluid coolant conduit; and
   a coolant feed inlet manifold having a coolant inlet;
      the coolant feed inlet manifold coupled to each fluid coolant conduit for distribution of coolant to each fuel cell; and
      the coolant feed inlet manifold further comprising a discharge conduit located at one end of the coolant feed inlet manifold, the discharge conduit configured to discharge excess coolant from the coolant feed inlet manifold.

The discharge conduit may comprise an additional plate extending across the stack and disposed at the one end of the fuel cell stack. The additional plate may comprise a heater plate, a current collector plate or an insulator plate. The discharge conduit may comprise a conduit of increased flow impedance compared to the coolant feed inlet manifold, such that a coolant flow rate from the coolant feed inlet manifold to the discharge conduit is within a predetermined flow rate range. A second discharge conduit may be located at an opposite end of the coolant feed inlet manifold to the first discharge conduit. The second discharge conduit may comprise an additional plate extending across the stack and disposed at the opposite end of the fuel cell stack. The additional plate may comprise a heater plate, a current collector plate or an insulator plate. The discharge conduit may comprise a recirculation path coupled to the coolant inlet for the recirculation of coolant to the coolant feed inlet manifold. The fuel cell stack assembly may include a coolant resistivity monitor configured to determine the resistivity of coolant passing through the recirculation path. The discharge conduit may be coupled to an external coolant sump or tank. A flow control assembly may be coupled to the discharge conduit configured to control the flow of coolant fluid from the coolant feed inlet manifold to the discharge conduit. The flow control assembly may comprise a variable flow restrictor. The end of the fuel cell stack with the discharge conduit may be an electrically positive end of the fuel cell stack. An outlet manifold may be coupled to each fluid coolant conduit of the plurality of fuel cells for receiving coolant from each fuel cell. discharge conduit may form part of the outlet manifold.

Embodiments of the present invention will now be described by way of example and with reference to the accompanying drawings in which.

The various embodiments described below provide excess coolant injected into a coolant feed inlet manifold. The coolant may be water, preferably deionised water. A portion of the injected coolant passes to fluid coolant conduits in the fuel cells in the fuel cell stack. Another portion, described as the excess coolant, exits the coolant feed inlet manifold via a discharge conduit without passing through the fuel cells. By providing an excess of coolant to the coolant feed inlet manifold via the coolant inlet, the flow of coolant at the end of the manifold furthest from the inlet is sufficient to avoid or reduce problems arising due to very low coolant flow rates or stagnant coolant in the manifold.

The embodiments described herein do not necessarily require the use of additional valve, pump and/or controllers in order to achieve the flow rates required to mitigate coolant stagnation problems. Thus the present invention advantageously provides improved fuel cell stack assemblies without the logistical considerations, extra engineering, maintenance considerations and increased cost of including additional components such as valves. However, the invention allows the incorporation of such valves if required for further control of the coolant fluid to/from the fuel cells.

Further, embodiments described herein provide a solution to the problem of low coolant flow rates and coolant stagnation which can readily be combined with other design variations for fuel cell stacks, thereby contributing to a modular fuel cell system with flexibility for tailoring depending on the particular conditions required.

Figure 1:
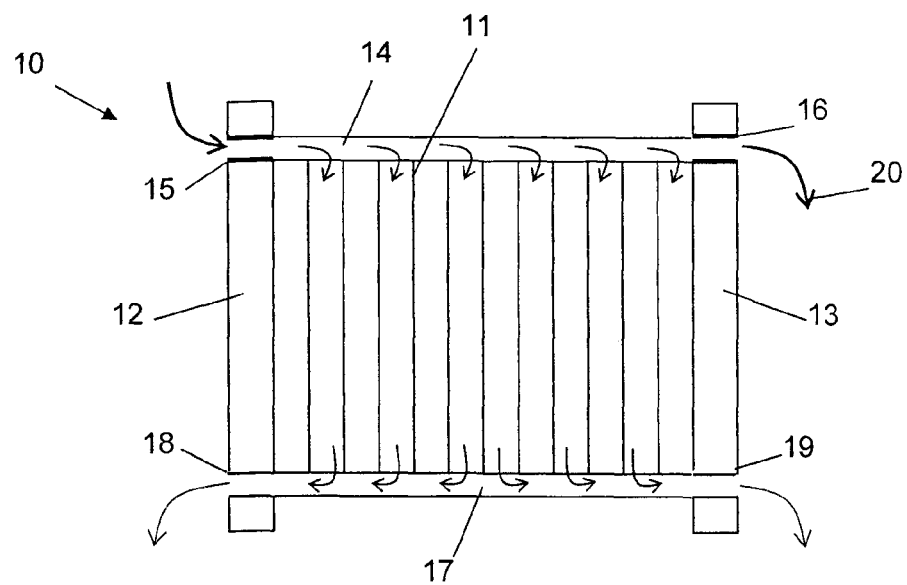
FIG. 1 is a schematic side view of a fuel cell stack with a coolant feed inlet manifold and discharge outlet.

FIG. 1 shows a schematic side view of a fuel cell stack 10. The stack 10 comprises a plurality of fuel cells 11, each of which has an anode fluid flow path for delivering fuel to an anode surface of a membrane-electrode assembly and a cathode fluid flow path for delivering oxidant to a cathode surface of a membrane-electrode assembly. The fuel cells are held in a stack arrangement by way of end plates 12, 13 in a known manner. The anode fluid flow paths or the cathode fluid flow paths are provided with coolant injection for evaporative cooling of the fuel cell stack by way of a coolant feed inlet manifold 14, which extends down the length of the stack 10 between a coolant inlet 15 and a discharge conduit 16 at opposing ends of the coolant feed inlet manifold 14. The coolant feed inlet manifold 14 may be described as a coolant/water delivery manifold or gallery.

As indicated by the arrows in FIG. 1, coolant flows into the manifold from the coolant inlet 15, then into each of the fluid flow paths of the separate fuel cells 11. Preferably, the coolant combines with the fuel or oxidant flow at some point between the coolant feed inlet manifold 14 and flow channels in the individual fuel cells 11. These flow channels extend across the active surfaces of the fuel cells 11. The fuel and oxidant may be introduced into the individual cells 11 using a separate fuel manifold and a separate oxidant manifold using known techniques. In some embodiments, unused fuel or oxidant may pass out of the fuel cells into an outlet manifold 17 and, in some embodiments, from there to one or more exhaust ports/outlets 18, 19. An outlet manifold 17 is not necessarily required for the anode fluid flow paths if all fuel is consumed at the active surfaces of the fuel cells 11, particularly if coolant injection is not provided on the anode sides of the fuel cells 11, although an anode exhaust line may be provided for periodic purging. In the embodiments described herein, an outlet manifold 17 is shown coupled to each fluid coolant conduit of the plurality of fuel cells 11 for discharge of at least coolant from each fuel cell 11.

Also shown in FIG. 1 is a discharge conduit 16 for excess coolant 20 to pass out of the coolant feed inlet manifold 14 without passing through the fluid coolant conduits of the fuel cells 11. The discharge conduit 16 of FIG. 1 may be described as an external coolant drain. FIG. 1 thus shows a fuel cell stack assembly 10 comprising a plurality of fuel cells 11 each having a fluid coolant conduit, and a coolant feed inlet manifold 14 having a coolant inlet 15. The coolant feed inlet manifold 14 is coupled to each fluid coolant conduit of the fuel cells 11 for distribution of coolant to each fuel cell. The coolant feed inlet manifold 14 further comprises a discharge conduit 16 located at one end of the coolant feed inlet manifold 14. The discharge conduit 16 is configured to discharge excess coolant 20 from the coolant feed inlet manifold 14.

By locating the discharge conduit 16 at the opposite end of the coolant feed inlet manifold 14 to the coolant inlet 15, excess coolant may be injected via the coolant inlet 15 to the fuel cell stack 10 and the portion of the manifold furthest from the coolant inlet 15 need not be subject to very low coolant flow rates. A coolant fluid flow may be provided at the coolant inlet 15 to the coolant feed inlet manifold 14 such that there is sufficient flow through the manifold, even at the end of the fuel cell stack 10 furthest from the coolant inlet 14, to avoid or mitigate coolant fluid stagnation which can lead to problems as described earlier. Excess coolant 20, which does not pass through the fuel cells 11, exits the coolant feed inlet manifold 14 by the discharge conduit 16.

Figure 2:
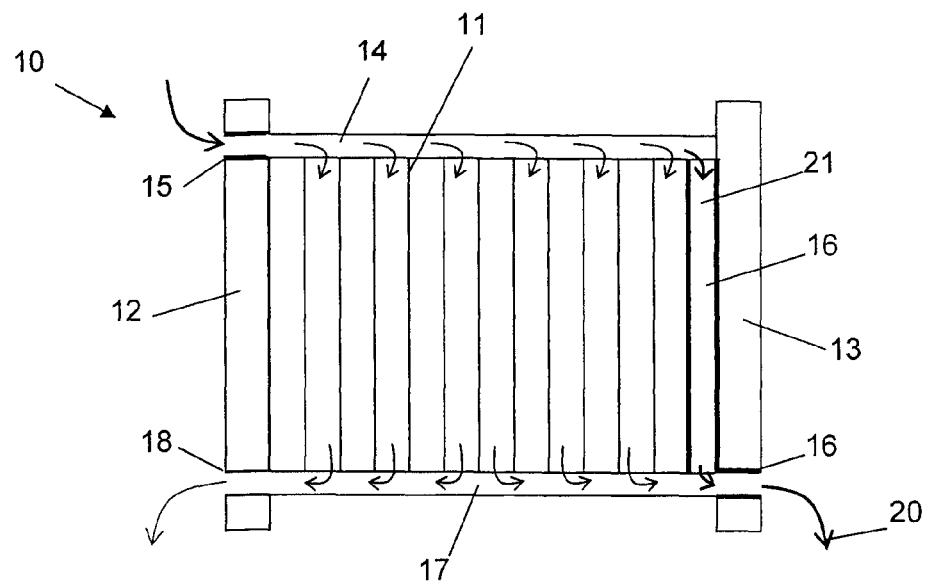
FIG. 2 is a schematic side view of an alternative fuel cell stack with a coolant feed inlet manifold and discharge outlet.

FIG. 2 shows a fuel cell stack assembly 10 comprising a plurality of fuel cells 11 each having a fluid coolant conduit, and a coolant feed inlet manifold 14 having a coolant inlet 15 at one end of the stack. The coolant feed inlet manifold 14 comprises a discharge conduit 16 located at the other end of the stack, and the discharge conduit 16 is configured to discharge excess coolant 20 from the coolant feed inlet manifold 14. In this example, the discharge conduit 16 passes from the end of the coolant feed inlet manifold 14 opposite the coolant inlet 15, across the fuel cell stack 10, parallel to the fuel cell conduits, to the side of the stack opposite to the coolant feel inlet manifold 14, before passing out through an outlet manifold 17. In the embodiments described with respect to FIGS. 2, 4, 5, 6 and 8, the discharge conduit 16 is shown to form part of the outlet manifold 17, although this need not be the case and the discharge conduit 16 may pass out from the fuel cell stack via a path separate from the outlet manifold 17.

In some embodiments represented by FIG. 2, the discharge conduit 16 may comprise or be formed within an additional plate 21 extending across the width of the stack, parallel to the fuel cells, and disposed at the end of the fuel cell stack 10. This additional plate 21 could be a heater plate or a current collector plate or an insulator plate adjacent to the end plate 13. The discharge conduit 16 in FIG. 2 may be described as an internal coolant drain. The discharge conduit 16 may be formed within the additional plate 21 to allow the passage of excess coolant from the side of the fuel cell stack opposite the coolant inlet 15. If the discharge conduit 16 is included within a heater plate, the discharge conduit 16 may preferably be located on the opposite side of the heater plate to the side incorporating heating elements. Providing the discharge conduit 16 within a heater plate may provide an additional benefit in that, during cold start and operation, the heater plate may defrost any traces of ice in the discharge conduit 16 allowing improved start up and operation.

The discharge conduit 16 may comprise a conduit of predetermined reduced dimensions (compared to the dimensions of the manifold 14) to create a back pressure such that a coolant flow rate from the coolant feed inlet manifold 14 into the discharge conduit 16 is within a predetermined flow rate range. The discharge conduit 16 may be a length of pipework having particular dimensions relative to the coolant feed inlet manifold 14 and may be at least partially serpentine or tortuous in form. The discharge conduit thereby presents a suitably increased impedance to coolant flow compared to the manifold and thereby achieves a desired flow rate and back pressure to the manifold. In this way, the flow parameters for coolant flow within the fuel cells 11 and excess coolant flow out from the coolant feed inlet manifold 14 may be controlled.

Figure 3:
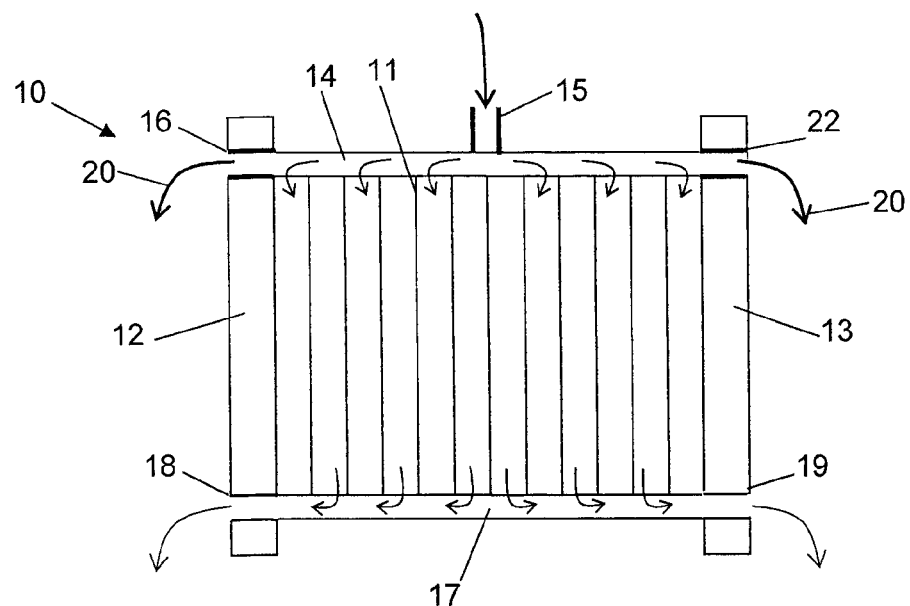
FIG. 3 is a schematic side view of a fuel cell stack with a coolant feed inlet manifold and two discharge outlets.

FIG. 3 shows a fuel cell stack assembly 10 comprising a plurality of fuel cells 11 each having a fluid coolant conduit, and a coolant feed inlet manifold 14 having a coolant inlet 15 located towards the centre of the coolant feed inlet manifold 14. The coolant feed inlet manifold 14 comprises, in this embodiment, a first discharge conduit 16 located at one end of the coolant feed inlet manifold 14 and a second discharge conduit 22 located at an opposite end of the coolant feed inlet manifold 14. The discharge conduits 16, 22 are both configured to discharge excess coolant from the coolant feed inlet manifold 14.

Whereas the examples of FIGS. 1 and 2 show the coolant inlet 15 located at one end of the coolant feed inlet manifold 14, the example of FIG. 3 shows the coolant inlet 15 located at the centre of the coolant feed inlet manifold 14. The embodiment of FIG. 3 provides for an excess coolant flow into the coolant feed inlet manifold 15 such that coolant can flow to each of the fuel cells in the stack 10, including those furthest from the coolant inlet 15 (those at the two ends of the fuel cell stack), with a sufficiently high flow so as to mitigate problems from stagnant coolant, or very low coolant flow rates in the manifold ends remote from the coolant inlet 15. The excess coolant 20 which does not pass through the flow conduits of the fuel cells 11 exits the coolant feed inlet manifold 14 by the two discharge conduits 16, 22. FIG. 3 also shows two exhaust ports/outlets 18, 19 for unused fuel or oxidant to pass out of the outlet manifold 17.

Figure 4:
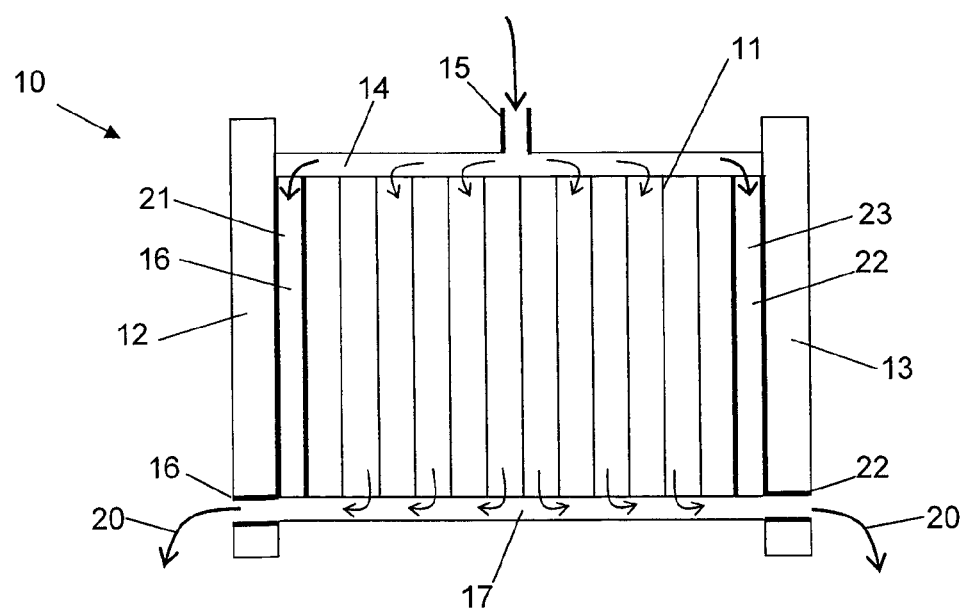
FIG. 4 is schematic side view of an alternative fuel cell stack with a coolant feed inlet manifold and two discharge outlets.

FIG. 4 illustrates a fuel cell stack assembly 10 comprising a plurality of fuel cells 11 each having a fluid coolant conduit, and a coolant feed inlet manifold 14 having a coolant inlet 15 located towards the centre of the coolant feed inlet manifold 14, similar to FIG. 3. The coolant feed inlet manifold 14 comprises, in this embodiment, a first discharge conduit 16 located at one end of the coolant feed inlet manifold 14 and a second discharge conduit 22 located at the opposite end of the coolant feed inlet manifold 14. Both the first discharge conduit 16 and the second discharge conduit 22 comprise an additional plate 21, 23 disposed at the ends of the fuel cell stack 10. The additional plates 21, 23 could each be a heater plate or a current collector plate or an insulator plate adjacent to the respective end plate 12, 13. The discharge conduits 16, 22 are configured to discharge excess coolant from the coolant feed inlet manifold 14.

The embodiment of FIG. 4 provides a similar advantage to that of FIG. 2, in that if the additional plates 21, 23 are provided as heater plates, any traces of ice present in the discharge conduits 16, 22 may be defrosted upon cold start of the fuel cell stack 10 without adding complexity to the fuel cell stack 10.

If desired, a fuel cell stack may be formed having a first discharge conduit 16 as shown in FIG. 3 exiting the coolant feel inlet manifold 14 directly, and a second discharge conduit 22 comprised within an additional plate 23 as shown in FIG. 4. The additional plates 21, 23 at respective ends may be of different types. The location of the coolant inlet 15 need not be in the centre of the coolant feel inlet manifold, and may be located part way along the manifold 14 if desired.

Figure 5:
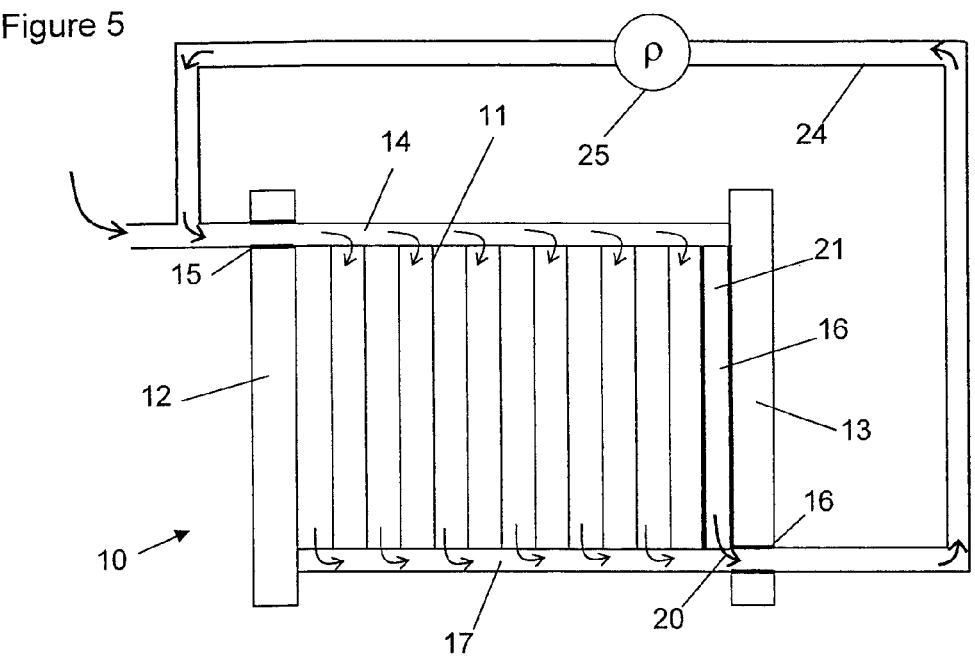
FIG. 5 is a schematic view of the fuel cell stack of FIG. 2 coupled for recirculating coolant delivery to the coolant feed inlet manifold.

FIG. 5 illustrates the fuel cell stack 10 of FIG. 2 in which the discharge conduit 16 includes a recirculation path 24 coupled to the coolant inlet 15 for the recirculation of coolant to the plurality of fuel cells 11. A pump, not shown, may be provided within the recirculation path 24. As shown in FIG. 5, a coolant resistivity monitor 25 may be provided to determine the resistivity of coolant passing through the recirculation path 24. By recirculating the coolant fluid, there is less wastage of coolant fluid. By monitoring the resistivity of the coolant fluid, it may be determined when the coolant requires replacement or partial replacement. For example, a resistivity value below a particular value for deionised water may be used to control replacement of recirculating water or dilution of recirculating water. An exemplary minimum value could be, for example, 0.1 MOhm·cm. The location of the resistivity monitor 25 may be anywhere along the path of the recirculated coolant, and may therefore be located, for example, at the coolant inlet 15, in the recirculation path 24, or in the discharge conduit 16 internal to the fuel cell stack 10. More than one such resistivity monitor 25 may be used if desired, at different locations along the path of recirculated coolant.

Figure 6:
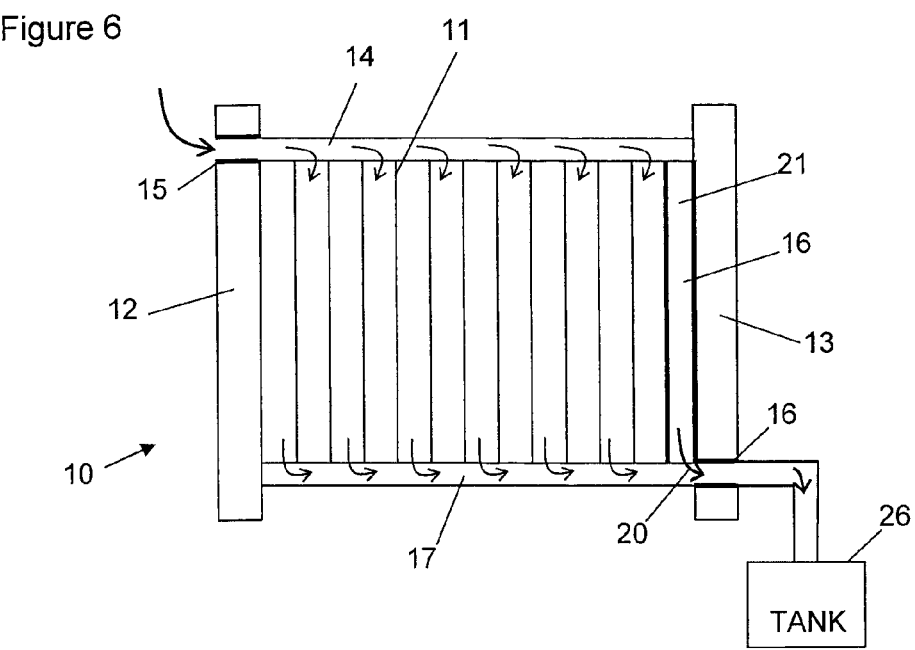
FIG. 6 is a schematic view of the fuel cell stack of FIG. 2 coupled for passage of discharged coolant to a tank.

FIG. 6 illustrates the fuel cell stack 10 of FIG. 2 in which the discharge conduit 16 is coupled to an external coolant sump or tank 26. Thus excess coolant which is no longer required may be collected for storage, or for dilution and re-use in the fuel cell stack 10. The embodiments shown in FIGS. 5 and 6 may be combined with the use of a valve and controller if desired. For example, coolant fluid may be recirculated until a predetermined value of resistivity of the coolant is reached. Upon reaching the predetermined value of resistivity, the controller may switch a valve to change the path of the excess coolant from being recirculated via recirculation path 24 to being discharged to a tank 26.

Figure 7:
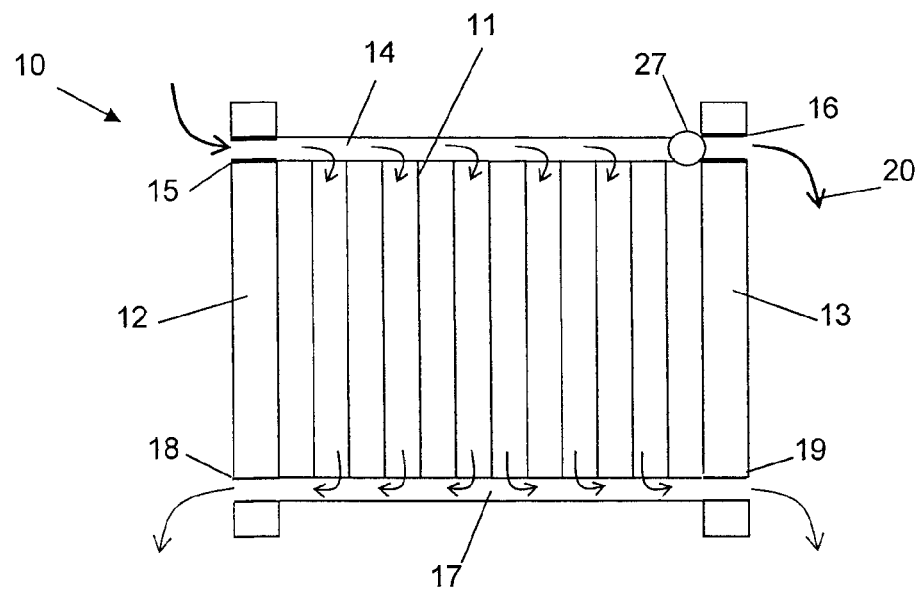
FIG. 7 is a schematic view of the fuel cell stack of FIG. 1 comprising a variable flow controller.
Figure 8:
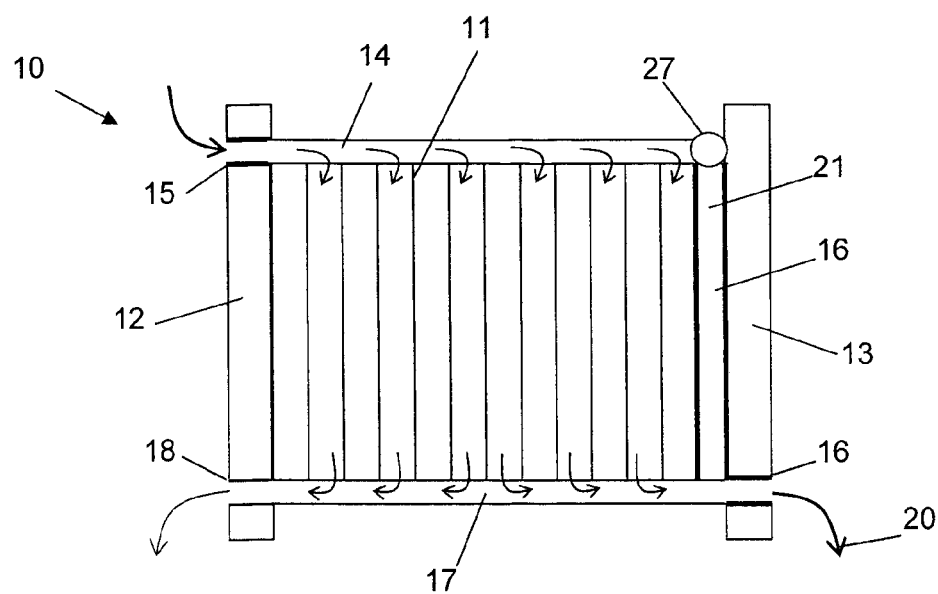
FIG. 8 is a schematic view of the fuel cell stack of FIG. 2 comprising a variable flow controller.

FIGS. 7 and 8 show the embodiments of FIGS. 1 and 2 respectively, further comprising a flow control assembly 27. The flow control assembly 27 is coupled to the discharge conduit 16 and is configured to control the back pressure of coolant fluid in the manifold 14 at the discharge conduit 16, such that the pressure of coolant fluid at the discharge conduit 16 can be held within a predetermined pressure range. The discharge conduit 16 may therefore comprise a flow control assembly 27 as a means for varying flow impedance and thereby back pressure to the manifold 14.

The flow control assembly 27 may comprise, for example, one or more of a variable flow restrictor, an orifice plate, a needle valve, tubing of a predetermined length, and tubing of a predetermined width. For example, if the pressure at the end of the coolant feed inlet manifold, at the location of the flow control assemblies of FIGS. 7 and 8, is 1 bar, and 50 ml/min of coolant is to be injected via the coolant inlet 15, then a 3 m length of discharge conduit 16 with a 1 mm diameter may be used between the outlet of the coolant feed inlet manifold 14 and the coolant inlet 15 to achieve this pressure.

The end of the fuel cell stack 10 where the coolant inlet 15 is located in the embodiments described with respect to FIGS. 1, 2, 5, 6, 7 and 8 may be selected as a negative polarity end of the fuel cell stack, and the opposite end of the fuel cell stack may be selected as a positive end. This could be reversed, if required.

Other embodiments are intentionally within the scope of the accompanying claims.

The invention claimed is:

1. An evaporatively cooled fuel cell stack assembly comprising:
    a plurality of fuel cells with each fuel cell having a fluid coolant conduit, wherein the fluid coolant conduit consists of either an anode fluid flow path for delivering fuel to an anode surface of a membrane-electrode assembly or a cathode fluid flow path for delivering oxidant to a cathode surface of a membrane-electrode assembly; and
    a coolant feed inlet manifold having a coolant inlet;
    the coolant feed inlet manifold coupled to each fluid coolant conduit for distribution of coolant to each fuel cell; and
    the coolant feed inlet manifold further comprising a discharge conduit located at one end of the coolant feed inlet manifold, the discharge conduit configured to discharge excess coolant from the coolant feed inlet manifold.

2. The fuel cell stack assembly of claim 1, wherein the discharge conduit comprises an additional plate extending across the stack and disposed at the one end of the fuel cell stack.

3. The fuel cell stack assembly of claim 1, wherein the additional plate comprises a heater plate, a current collector plate or an insulator plate.

4. The fuel cell stack assembly of claim 1, wherein the discharge conduit comprises a conduit of increased flow impedance compared to the coolant feed inlet manifold, such that a coolant flow rate from the coolant feed inlet manifold to the discharge conduit is within a predetermined flow rate range.

5. The fuel cell stack assembly of claim 1, wherein:
    the discharge conduit located at the one end of the coolant feed inlet manifold is a first discharge conduit; and
    further comprising:
        a second discharge conduit located at an opposite end of the coolant feed inlet manifold to the first discharge conduit.

6. The fuel cell stack assembly of claim 5, wherein:
    the second discharge conduit located at the opposite end of the coolant feed inlet manifold to the first discharge conduit comprises an additional plate extending across the stack and disposed at the opposite end of the fuel cell stack.

7. The fuel cell stack assembly of claim 5, wherein:
    the additional plate comprises a heater plate, a current collector plate or an insulator plate.

8. The fuel cell stack assembly of claim 1 in which the discharge conduit comprises a recirculation path coupled to the coolant inlet for the recirculation of coolant to the coolant feed inlet manifold.

9. The fuel cell stack assembly of claim 8, further comprising:
    a coolant resistivity monitor configured to determine the resistivity of coolant passing through the recirculation path.

10. The fuel cell stack assembly of claim 1 wherein the discharge conduit is coupled to an external coolant sump or an external coolant tank.

11. The fuel cell stack assembly of claim 1 further including a flow control assembly coupled to the discharge conduit, said flow control assembly configured to control the flow of coolant fluid from the coolant feed inlet manifold to the discharge conduit.

12. The fuel cell stack assembly of claim 11 in which the flow control assembly comprises a variable flow restrictor.

13. The fuel cell stack of claim 1 in which the end of the fuel cell stack with the discharge conduit is an electrically positive end of the fuel cell stack.

14. The fuel cell stack assembly of claim 1, further comprising an outlet manifold coupled to each fluid coolant conduit of the plurality of fuel cells for receiving coolant from each fuel cell.

15. The fuel cell stack assembly of claim 14, wherein the discharge conduit forms part of the outlet manifold.

* * * * *